UNITED STATES PATENT OFFICE.

ANTON POSSELT, OF HANOVER, GERMANY, ASSIGNOR TO WILHELM ROEDER, OF HANOVER, GERMANY.

MOTH-DESTROYING COMPOSITION.

979,704.  Specification of Letters Patent.  Patented Dec. 27, 1910.

No Drawing.  Application filed May 12, 1909. Serial No. 495,419.

*To all whom it may concern:*

Be it known that I, ANTON POSSELT, a citizen of Germany, residing at Hanover, Germany, have invented an Improved Moth-Destroying Composition, of which the following is a specification.

The flour moth (*Ephestia kuhenielle zeller*), a small member of the family *Pyralides*, 10–14 millimeters long and 20 millimeters broad, is of a brilliant leadgray, yellow or almost brown upon the front wings, and showing fine dark markings. The caterpillar attains to a length of two centimeters, is white, reddish or whitish green, brown on the head and neck, and set with single, glittering bristles. The pupa is smaller, of a bright yellow brown. The insect has for a long time been found in Holland, France, England, Russia, the South of Europe, North America and Chili, and since about 1883, has done considerable damage in Germany, particularly in steam mills where the high temperature is favorable to their development. The caterpillar contaminates the flour by its excrement, destroys everything it can reach and some times compels the steam mills to temporarily suspend working for the purposes of cleaning, especially as far as the tubes, flour chests, etc., are concerned.

In order to fight successfully against the flour moth, the usual method hitherto recommended and resorted to has been to catch the butterflies, to disinfect the sacks by which the flour moth was often spread, by means of bisulfid of carbon, to keep the mill scrupulously clean, to raise the temperature to 50° while keeping the air moist (in steam mills), and to disinfect with sulfurous acid. All these methods were attended with the disadvantage that they can only be resorted to at times, so that they only enable those flour moths to be destroyed which have developed since the previous destruction, and the working of the mill has always had to be suspended. These disadvantages are obviated by my improved composition, whereby a continuously effective means is afforded not only for killing the existing flour moths, but also for preventing their formation.

The vapors of turpentine or turpentine oil or other turpentine compounds are intended to serve for the destruction of the flour moths. Long trials have shown that these insects do not live long in rooms filled with the evaporating turpentine. The caterpillars are likewise killed after having been exposed for some time to the action of the evaporating turpentine. If, however, they develop into moths, the young moths cannot live long, and, at any rate, die before they can multiply, so that in a short time the respective rooms treated with the turpentine will be free from the flour moths and their eggs. As the turpentine volatilizes rapidly in atmospheric air, it is not practicable to use it in its pure state. To retard the volatilization, a non-volatile oil, such as linseed oil is added, which incases the turpentine particles. But linseed oil, when exposed to the air, will become oxidized or resinified, so as to rapidly dry up. I therefore further add a fatty oil, such as poppy oil, which is oxidized much more slowly than the linseed oil, and therefore retards the drying up of the latter. A good composition is obtained by mixing 80 parts of turpentine oil with 10 parts of linseed oil and 10 parts of poppy oil. The composition may be applied by soaking woolen refuse or similar material with the liquid and placing it in suitable places in the mill, for example upon the joists, or under the ceilings. In large automatic mills, these materials soaked with the liquid are attached to the machines, lifts, mixing machines, conveyers and the like, the evaporation of the liquid gradually exercising its influence upon the insects. The tubes in particular which are often entirely filled with the webs of the insects, can be easily freed from the insects by attaching in the interior of the valves, flannel or woolen rags or other porous materials which have been soaked with the liquid. American turpentine has proved especially suitable, its flavor being less intense than that of German turpentine. The liquid is harmless to the flour and to the workmen. The materials soaked with the liquid may also, in particular, be attached in a suitable manner to the underside of the covers of the mixing and collecting receptacles, in order that they may exercise their influence upon the receptacles.

What I claim is:

A moth destroying composition composed of turpentine, a quickly oxidizing oil adapted to incase the turpentine particles, and a more slowly oxidizing oil, which retards the drying up of the quickly oxidizing oil.

Signed by me at Hanover, Germany, this 29th day of April, 1909.

ANTON POSSELT.

Witnesses:
J. M. BOWCOCK,
L. VAN DER LAAN.